US012739240B2

(12) United States Patent
Miah et al.

(10) Patent No.: US 12,739,240 B2
(45) Date of Patent: Sep. 15, 2026

(54) SYSTEMS AND METHODS FOR PROVIDING DIGITAL AUTHENTICATION AS A SERVICE

(71) Applicant: JPMORGAN CHASE BANK, N.A., New York, NY (US)

(72) Inventors: Mizan Miah, Wilmington, DE (US); Jasbir Banga, Swedesboro, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 393 days.

(21) Appl. No.: 17/344,655

(22) Filed: Jun. 10, 2021

(65) Prior Publication Data

US 2021/0392128 A1 Dec. 16, 2021

Related U.S. Application Data

(60) Provisional application No. 63/037,653, filed on Jun. 11, 2020.

(51) Int. Cl.
*H04L 9/40* (2022.01)

(52) U.S. Cl.
CPC .......... *H04L 63/083* (2013.01); *H04L 63/102* (2013.01); *H04L 63/20* (2013.01)

(58) Field of Classification Search
CPC ..... H04L 63/083; H04L 63/20; H04L 63/102; H04L 67/306; G06F 21/31
See application file for complete search history.

(56) References Cited

U.S. PATENT DOCUMENTS 9,860,241 B2 * 1/2018 Dixon ................. H04L 63/0876
10,122,761 B2 * 11/2018 Newell .............. H04L 63/0815
2010/0100725 A1 * 4/2010 Ozzie ...................... G06F 21/43 713/155
2016/0315933 A1 * 10/2016 Nichols ................ H04L 67/306
2018/0131721 A1 * 5/2018 Jones .................... G06F 21/604
2018/0139199 A1 * 5/2018 Ahuja .................. H04L 67/306
2018/0218121 A1 * 8/2018 Gassner .............. G06Q 30/018
2019/0007409 A1 1/2019 Totale et al.
2019/0334921 A1 * 10/2019 Pattar .................... H04L 9/3271
2021/0160231 A1 * 5/2021 Kumar ................ H04L 63/0815

FOREIGN PATENT DOCUMENTS

JP 2017162129 A * 9/2017

OTHER PUBLICATIONS

International Search Report and Written Opinion, dated Sep. 23, 2021, from corresponding International Application No. PCT/US2021/036853.

* cited by examiner

*Primary Examiner* — Hadi S Armouche
(74) *Attorney, Agent, or Firm* — GREENBERG TRAURIG LLP

(57) ABSTRACT

A method for providing enrollment as a service may include an enrollment as a service computer program: (1) receiving, from an entity website, a SAML assertion or a JSON Web Token comprising a customer identifier and customer information for a validated customer; (2) creating a user profile for the customer identifier and the customer information; (3) creating a username and password for the customer identifier; (4) receiving, from the entity website, an authentication as a service request; (5) presenting a login page at the entity website; (6) receiving, from the login page, the username and password; (7) authenticating the username and password; and (8) returning an authentication status to the entity website.

11 Claims, 2 Drawing Sheets

SYSTEMS AND METHODS FOR PROVIDING DIGITAL AUTHENTICATION AS A SERVICE

RELATED APPLICATIONS

This application claims priority to, and the benefit of, U.S. Provisional Patent Application Ser. No. 63/037,653, filed Jun. 11, 2020, the disclosure of which is hereby incorporated, by reference, in its entirety.

BACKGROUND OF THE INVENTION

1. Field of the Invention

Embodiments relate generally to systems and methods for providing digital authentication as a service. Embodiments may facilitate the registration of a third party on a first party platform.

2. Description of the Related Art

As products and capabilities become more integrated across multiple parties, there is friction in the ability to provide a method to setup accounts across multiple parties in a seamless experience to the end user. For example, a financial institution may want to offer the ability for a customer to open a credit or banking account from another financial service offering provided by a different party.

SUMMARY OF THE INVENTION

Systems and methods for providing digital authentication as a service are disclosed. According to one embodiment, a method for providing enrollment as a service may include: (1) receiving, at an enrollment as a service computer program and from an entity website, a Security Assertion Markup Language (SAML) assertion or a JSON Web Token (JWT) comprising a customer identifier and customer information for a validated customer; (2) creating, by the enrollment as a service computer program, a user profile for the customer identifier and the customer information; (3) creating, by the enrollment as a service computer program, a username and password for the customer identifier; (4) receiving, at the enrollment as a service computer program and from the entity website, an authentication as a service request; (5) presenting, by the enrollment as a service computer program, a login page at the entity website; (6) receiving, by the enrollment as a service computer program and from the login page, the username and password; (7) authenticating, by the enrollment as a service computer program, the username and password; and (8) returning, by the enrollment as a service computer program, an authentication status to the entity website.

In one embodiment, the customer information may include a customer name, a customer address, and/or a customer email.

In one embodiment, the validated customer has been validated by the entity website to be a person.

In one embodiment, the login page may be presented in an inline frame.

In one embodiment, the method may further include providing, by the enrollment as a service computer program, the user profile to the entity website in response to authenticating the username and password.

According to another embodiment, a method for using enrollment as a service may include: (1) receiving, at an entity website, customer information for a customer; (2) validating, by the entity website, the customer information; (3) invoking, by the entity website, enrollment as a service by providing a Security Assertion Markup Language (SAML) assertion or a JSON Web Token (JWT) comprising a customer identifier and customer information for the customer to an enrollment and authentication server, wherein the enrollment and authentication server may be configured to create a user profile for the customer; (4) receiving, from the enrollment and authentication server, an authentication status for the customer; and (5) retrieving, by the entity website and from the enrollment and authentication server, the user profile for the customer.

In one embodiment, the customer information may include a customer name, a customer address, and/or a customer email.

In one embodiment, the entity website may validate the customer by confirming that the customer is a person.

In one embodiment, the method may further include receiving, at the entity website and from the enrollment and authentication server, a login page; and presenting, by the enrollment and authentication server, the login page on the entity website.

In one embodiment, the login page may be presented in an inline frame.

According to another embodiment, a method for providing authentication as a service may include: (1) receiving, at an enrollment as a service computer program and from an entity website, invocation of authentication as a service; (2) presenting, by the enrollment as a service computer program, a login page at the entity website; (3) receiving, by the enrollment as a service computer program and from the login page, a username and a password; (4) authenticating, by the enrollment as a service computer program, the username and password; and (5) returning, by the enrollment as a service computer program, an authentication status to the entity website.

In one embodiment, the login page may be presented in an inline frame.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for providing digital authentication as a service. For example, embodiments may provide a web interstitial that brings the first party and third party together and facilitates seamless integration and data sharing.

Embodiments may provide the ability for customers to login and authenticate using user credentials for access to partner applications/sites; the ability for verified customers at partner applications/sites to sign up for user credentials with the authentication service; the ability to provide a customer or user profile ID for an authenticated customer to application sites via, for example, Security Assertion Markup Language (SAML) assertion, JSON Web Tokens (JWT), etc.; the ability to use a one-time use callback for other customer or user profile attributes from a customer or user profile, etc.

An example implementation is the opening of an account. For example, if a user that is not a customer of a financial institution or an entity accesses the entity, the customer may create user credentials with the authentication service and use those user credentials in the onboarding process with the entity.

Figure 1:
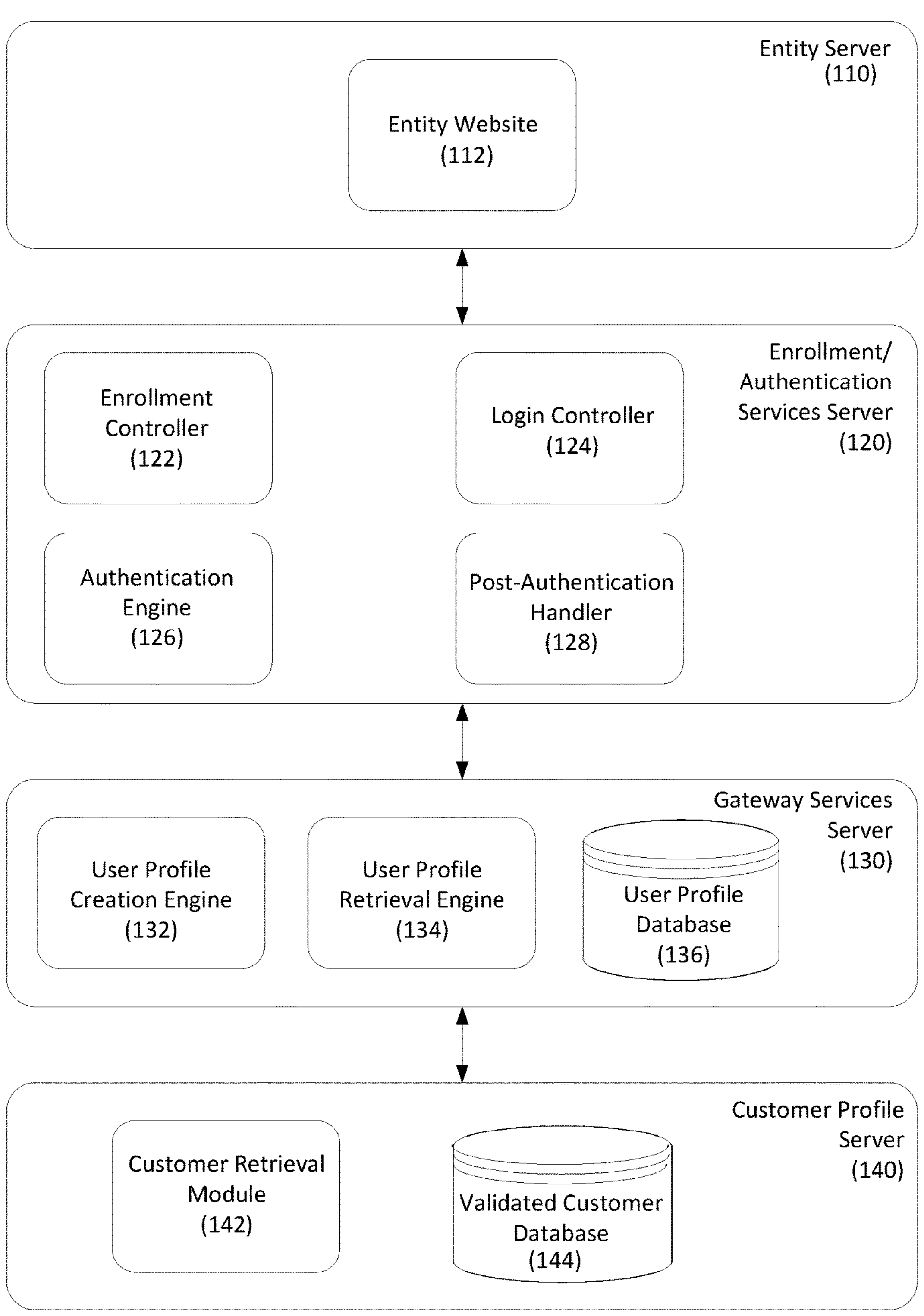
FIG. 1 depicts a system for providing digital authentication as a service according to an embodiment.

Referring to FIG. 1, an exemplary system and method for authentication as a service is provided according to an embodiment. For example, sites that are external to the authentication process may be responsible for pre-creating a customer identifier in a customer or user profile and passing the customer identifier in secure manner, for example, as a SAML assertion, a JWT encrypted token, etc.

System 100 may include entity server 110, enrollment/authentication services server 120, gateway services server 130, and customer profile server 140. Servers 110, 120, 130, and 140 may be a single server, multiple servers, etc.

Entity server 110 may host entity website 112. Entity website 112 may invoke enrollment services using, for example, enrollment controller 122, login services using, for example, login controller 124, authentication services using, for example, authentication engine 126, and post-authentication services using, for example, post-authentication handler 128. In one embodiment, a plurality of entity servers 110 may be provided, and each may access the same enrollment/authentication services server 120.

Enrollment/authentication services server 120 may include enrollment controller 122, login controller 124, authentication engine 126, and post-authentication handler 128. Enrollment controller 122 may receive a SAML assertion or a JWT from entity website 112 with a customer ID assigned by the entity. Enrollment controller 122 may create a user profile using user profile creation engine 132. Login controller 124 may present a login page in entity website 112 and may receive a username and password for a user. The login page may be presented as an inline frame ("iframe"). Login controller 124 may also look up a user profile using user profile retrieval engine 134 in gateway services server 130.

Authentication engine 126 may authenticate the user using the username/password received on the login page and may authenticate the user using any suitable process. Once authenticated, post-authentication handler 128 may retrieve the user profile using user profile retrieval engine 134 and may provide the user profile to entity website 112.

Gateway services server 130 may be provided in a layer between enrollment/authentication services server 120 and customer profile server 140. Gateway services server 130 may provide user profile creation engine 132 and user profile retrieval engine 134. Gateway services server 130 may further include user profile database 136, which may store user profiles created by user profile creation engine 132. User profile retrieval engine 134 may retrieve one or more user profiles from user profile database 136.

Customer profile server 140 may include customer retrieval module 142 that may retrieve validated customer information from validated customer database 144. Validated customer database 144 may include information on validated customers for the entity that provides the enrollment and authentication services.

In one embodiment, enrollment/authentication services server 120 may only allow validated customers to have and/or access account information.

The user profiles in user profile database 136 and the entries in validated customer database 144 may be linked by, for example, a customer identifier, a key, etc. In one embodiment, the customer identifier, key, etc. may be generated by validated customer database 144 at the time of customer creation.

Figure 2:
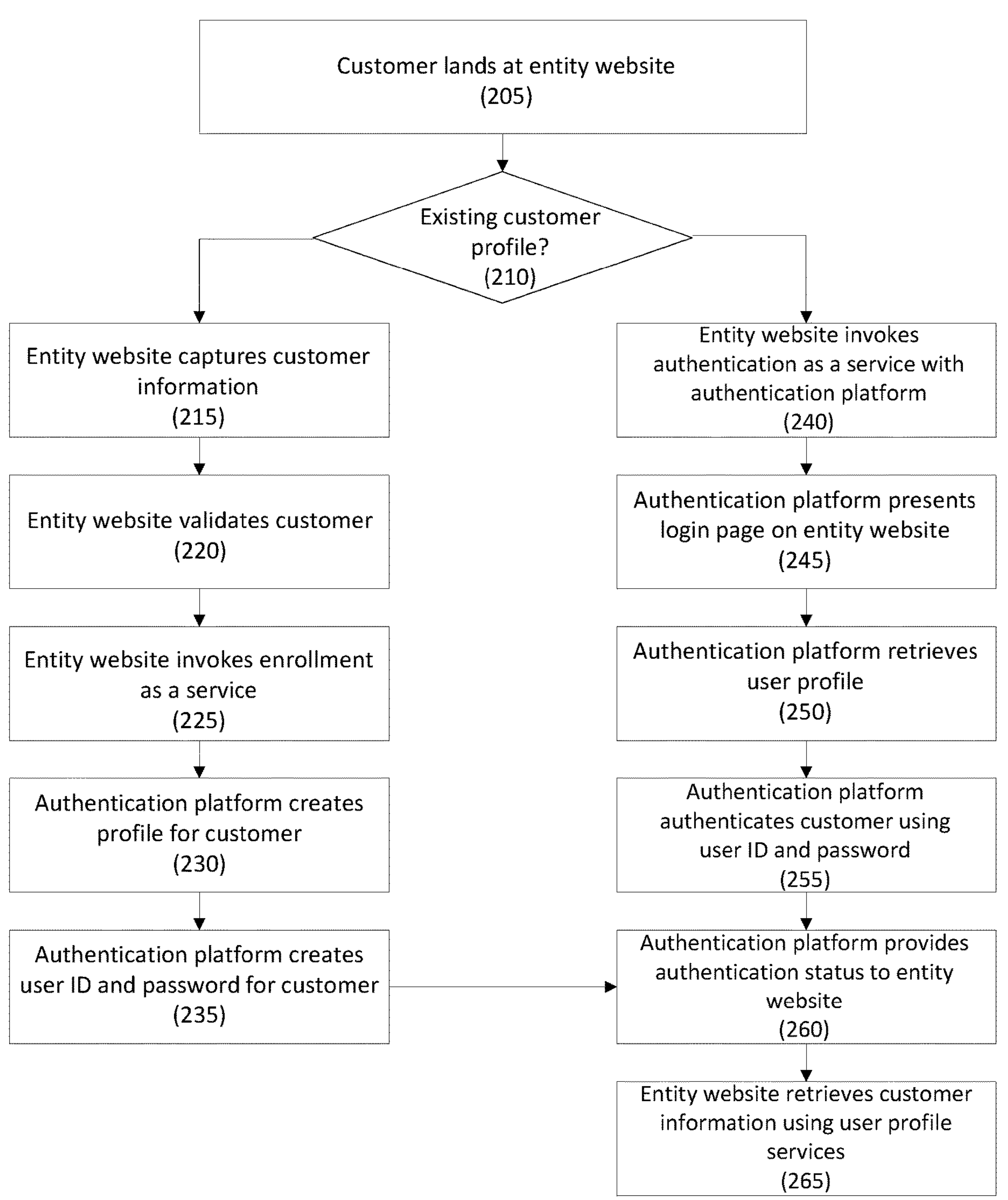
FIG. 2 depicts a method for providing digital authentication as a service according to an embodiment.

Referring to FIG. 2, an exemplary account opening process with authentication as a service is illustrated according to an embodiment.

In step 205, a customer may land at, or may access, an entity website. In one embodiment, the customer may land on the entity website using an application, a browser, etc.

In step 210, the entity website may determine whether the customer has an existing profile or not. If the customer does not have an existing profile, in step 215, the entity website may capture customer information, such as the customer's name, address, email address, etc.

In step 220, the entity website may validate the customer. For example, the entity website may perform customer validation, such as Know Your Customer (KYC) checks, identity validation, etc. and may validate that the customer is not a bot. Any other checks may be performed as is necessary and/or desired.

In one embodiment, as part of the customer validation process, the entity website may create a new customer entry in a validated customer database and may generate a customer identifier and/or a key.

In step 225, the entity website may invoke an enrollment service with enrollment/authentication services server. In one embodiment, the entity website may provide customer information in a SAML assertion, as a JWT, etc. For example, the customer information may include the customer name, the customer contact information (e.g., address, phone number, email address, etc.), the customer identifier or key, etc.

In step 230, a computer program executed by the enrollment/authentication services server may create a customer or user profile for the customer using the customer information.

In step 235, the computer program at the enrollment/authentication services server may interact with the customer to select a username and password for the customer and may associate the username and password with the customer or user profile. The computer program at the enrollment/authentication services server may provide an enrollment status to the entity website at the completion of enrollment.

Once enrolled, the process may continue to step 260, where the computer program at the enrollment/authentication services server may provide the authentication status to the entity website. In step 265, the entity website may retrieve the customer or user profile for the customer using the user profile services module.

If, in step 210, the customer has a customer profile, in step 240, the entity website may invoke authentication as a service with the enrollment/authentication services server.

In step 245, the computer program at the enrollment/authentication services server may present a login page on the entity website and the customer may enter the customer's username and password in the login page. In one embodiment, the login page may be presented as an iframe. In step 250, the computer program at the enrollment/authentication services server may retrieve the user profile.

In step 255, the computer program at the enrollment/authentication services server may receive the username and password from the login page and may authenticate the customer using the username and password. Any suitable authentication process may be used as is necessary and/or desired.

Once authenticated, in step 260, the computer program at the enrollment/authentication services server may provide the authentication status to the entity website. In one embodiment, the customer may use one authentication with a plurality of entity websites, and the computer program at the enrollment/authentication services server may inform other enrolled entity websites that the customer has been authenticated.

In step 265, the entity website may retrieve the customer profile for the customer using the user profile services module. In one embodiment, the entity may take any actions with the authenticated customer as is necessary and/or desired.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing enrollment as a service, comprising:

providing, by an enrollment as a service computer program, enrollment as a service to a plurality of entities;

receiving, at the enrollment as a service computer program and from an entity website for one of the plurality of entities, a Security Assertion Markup Language (SAML) assertion or a JSON Web Token (JWT) comprising a customer identifier and customer information for a validated customer that was validated by the entity website;

creating, by the enrollment as a service computer program, a user profile for the customer identifier and the customer information;

creating, by the enrollment as a service computer program, a username and password for the customer profile for the validated customer;

receiving, at the enrollment as a service computer program and from the entity website, an authentication as a service request;

presenting, by the enrollment as a service computer program, a login page at the entity website;

receiving, by the enrollment as a service computer program and from the login page, the username and password for the customer profile with the entity;

authenticating, by the enrollment as a service computer program, the username and password;

enrolling, by the enrollment as a service computer program, the username and password for the validated customer;

returning, by the enrollment as a service computer program, an authentication status to the entity website; and providing, by the enrollment as a service computer program, the user profile to the entity website in response to authenticating the username and password.

2. The method of claim 1, wherein the customer information comprises a customer name, a customer address, and/or a customer email.

3. The method of claim 1, wherein the validated customer has been validated by the entity website to be a person.

4. The method of claim 1, wherein the login page is presented in an inline frame.

5. A method for using enrollment as a service, comprising:

enrolling, by an entity website for an entity, the entity with an enrollment as a service computer program that provides enrollment as a service to a plurality of entities;

receiving, at the entity website, customer information for a customer;

validating, by the entity website, the customer information;

providing, by the entity website, a Security Assertion Markup Language (SAML) assertion or a JSON Web Token (JWT) comprising a customer identifier and customer information for the customer to an enrollment and authentication server to the enrollment as a service computer program, wherein the enrollment and authentication server is configured to create a user profile having a username and password for the customer, authenticate the customer, and enroll the username and password for the customer, wherein the enrollment and authentication server is configured to provides enrollment as a service for the plurality of entities;

receiving, from the enrollment and authentication server, an authentication status for the customer; and retrieving, by the entity website and from the enrollment and authentication server, the user profile for the customer.

6. The method of claim 5, wherein the customer information comprises a customer name, a customer address, and/or a customer email.

7. The method of claim 5, wherein the entity website validates the customer by confirming that the customer is a person.

8. The method of claim 5, further comprising:

receiving, at the entity website and from the enrollment and authentication server, a login page; and presenting, by the enrollment and authentication server, the login page on the entity website.

9. The method of claim 8, wherein the login page is presented in an inline frame.

10. A method for providing authentication as a service, comprising:

providing, by an enrollment as a service computer program, enrollment as a service to a plurality of entities;

receiving, by the enrollment as a service computer program and from an entity website for one of the plurality of entities, invocation of authentication as a service;

presenting, by the enrollment as a service computer program, a login page at the entity website;

receiving, by the enrollment as a service computer program and from the login page, a username and a password for a customer;

authenticating, by the enrollment as a service computer program, the username and password;

creating, by the enrollment as a service computer program, a user profile for the username;

enrolling, by the enrollment as a service computer program, the username and password for the customer; and returning, by the enrollment as a service computer program, an authentication status to the entity website.

11. The method of claim 10, wherein the login page is presented in an inline frame.

* * * * *